May 14, 1940.   J. E. HEHIR   2,201,091
SPLIT-WASHER-REMOVING TOOL
Original Filed Nov. 10, 1938

Inventor
James E. Hehir.
By
Attorney.

Patented May 14, 1940

2,201,091

UNITED STATES PATENT OFFICE 2,201,091

SPLIT-WASHER-REMOVING TOOL

James E. Hehir, Niagara Falls, N. Y.

Application November 10, 1938, Serial No. 239,864
Renewed November 30, 1939

4 Claims. (Cl. 81—3)

This invention relates to certain new and useful improvements in split-washer-removing tool.

The primary object of the invention is to provide a tool for the removal of a split-washer from a shaft, threaded shank or the like and is especially designed for the removal of split retaining washers on radio volume controls, band changing switches and other radio, electrical and mechanical devices.

A further object of the invention is to provide a tool of the foregoing character for the removal of split-washers from a shaft, bearing or the like and comprises a stationary handle bar and a handle lever pivoted thereon with cooperating devices carried by the handle bar and handle lever for effecting spreading action of the split ends of a washer and for the removal of the split-washer from a shaft or the like when the handle lever is pivotally moved toward the handle bar.

With the above and other objects in view that will become apparent as the nature of the invention is better understood, the same consists in the novel form, combination and arrangement of parts hereinafter more fully described, shown in the accompanying drawing and claimed.

Figure 3:
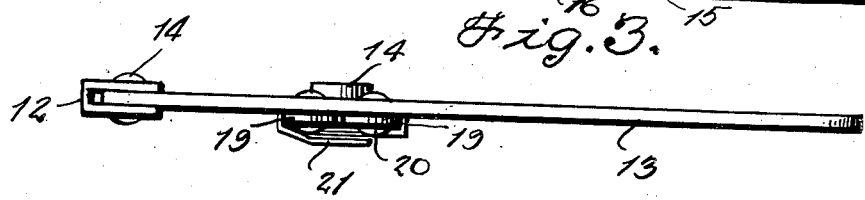
Figure 3 is a side edge elevational view.

The tool for the removal of split-washers comprises a stationary handle bar 10 that is rigidly attached at one of its ends as at 11 to one end of a cross head 12 that is U-shaped in end elevation as shown in Figure 3, the handle bar 10 being anchored between the side walls of the head 12 as shown. A handle lever 13 is normally disposed substantially parallel with the handle bar 10 and spaced therefrom, one end of the handle lever 13 being pivotally mounted as at 14 to the other end of the cross head 12 and between the side walls thereof.

Figure 1:
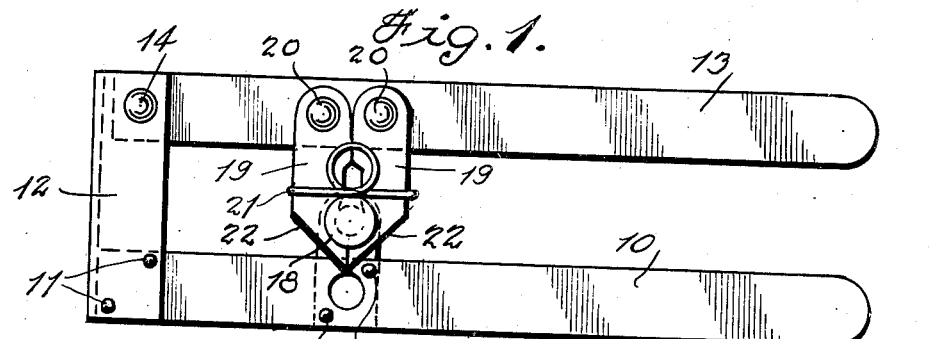
Figure 1 is a top plan view of a tool constructed in accordance with the present invention for the removal of split-washers showing a stationary handle bar for the support of a shaft carrying a split-washer and a handle lever pivoted to the handle bar carrying jaws for spreading the split ends of the washer.
Figure 2:
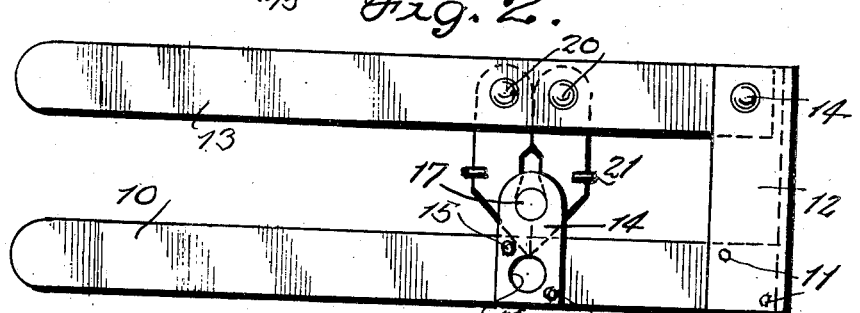
Figure 2 is a bottom plan view of the tool.

As shown more clearly in Figures 1 and 2, an arm 14 has one end thereof overlying and rigidly secured to the bottom face of the handle bar 10 as at 15, the arm projecting laterally of the handle bar 10 and terminating in spaced relation to the handle lever 13, said arm 14 being mounted upon the handle bar 10 in proximity of the cross head 12. Registering openings 16 are formed in the arm 14 and handle bar 10 for purposes presently to appear. A pin 17 is anchored at its lower end in the projecting end of the arm 14 and the upper end of the pin carries an enlarged disk head 18 as shown in Figures 1 and 5.

A pair of split washer spreading jaws 19 transversely aligned with the arm 14 is pivotally mounted as at 20 upon the upper face of the handle lever 13 and said jaws 19 are of a length to have their free ends overlap the upper side of the handle bar 10 and terminate adjacent the openings 16. A wire spring 21 is associated with the jaws 19 and acts to retain the jaws in engagement with each other. The combined free ends of the jaws are of V-shape as shown at 22 and terminate in an apex or point 23. As shown more clearly in Figures 4 to 6, the abutting edges of the jaws 19 between the handle bar 10 and handle lever 13 are cooperatively formed with cam grooves 24 through which the pin 17 extends with the disk head 22 upon the upper end of the pin 17 being disposed at the upper sides of the jaws 19 as shown in Figures 1 and 5.

Figures 4, 5, 6:
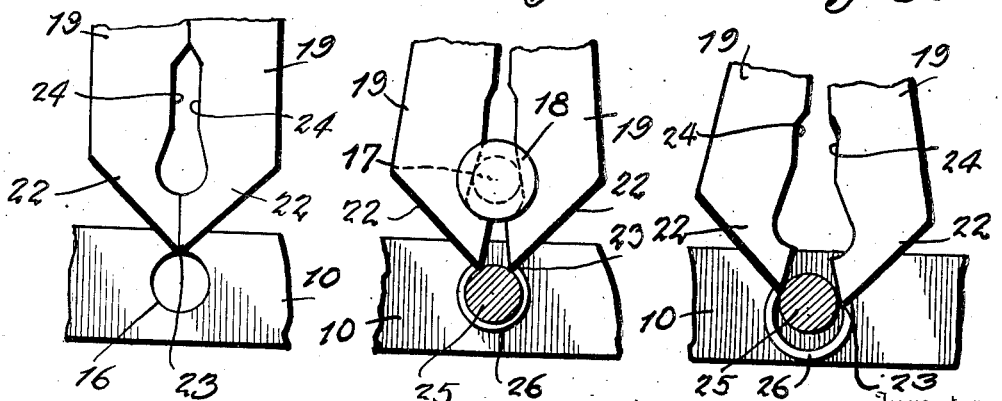
Figure 4 is a fragmentary plan view showing the stationary handle bar with an opening therein to receive the shaft carrying the split washer and the novel position of the spreading jaws relative to said opening.
Figure 5 is a fragmentary plan view similar to Figure 4 with the shaft carrying the split washer shown in section and the jaws initially spread apart to engage the split ends of the washer.
Figure 6 is a fragmentary plan view similar to Figure 5 showing the jaws spread apart to a further degree for spreading the split ends of the washer with the latter partially removed from the shaft.

The tool disclosed herein is primarily designed for removing split-washers from radio volume control, band changing switches and the like, the rod or shaft 25 of a radio element having a split-washer 26 thereon being illustrated in Figures 5 and 6 as positioned in the opening 16 in the handle bar 10 with the split washer 26 at the upper side of the handle bar. The pointed ends 23 of the V-shaped jaw ends 22 are normally disposed at the edge of the opening 16 as illustrated in Figure 4 and by rotating the shaft 25, the split ends of the washer 26 are respectively disposed at opposite sides of the jaw points 23. When the handle lever 13 is moved on its pivotal mounting 14 to the cross head 12 in the direction toward the handle bar 10, the pin 17 carried by the arm 14 projecting laterally of said handle bar has the cam grooves 24 in the adjacent edges of the jaws 19 moved thereover for separating said jaws as illustrated in Figure 5 to move the jaw points 23 into engagement with the split ends of the washer. Continued movement of the handle lever 13 towards the handle bar 10 causes the jaws 19 to further move on their pivot 20 to separate the split ends of the washer 26, the pointed ends of the jaws 19 also moving transversely of the handle bar 10 as shown in Figure 6 to dispose the split washer relative to the shaft 25 and ultimately remove the split washer from the shaft.

From the above detailed description of the tool, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:

1. In a tool of the character described, a head, a handle bar rigid with the head, a handle lever pivoted on the head and co-extensive with the handle bar, cooperating means carried by the handle bar and handle lever for spreading a split-washer and removing the same from a shaft, including a holder on the handle bar for a shaft carrying a split washer, a pair of tensioned split washer spreading and removing jaws carried by the handle lever in transverse alinement with said holder, and means carried by the holder for spreading said jaws when the latter are moved toward the handle bar.

2. In a tool of the character described, a head, a handle bar rigid with the head, a handle lever pivoted on the head and co-extensive with the handle bar, cooperating means carried by the handle bar and handle lever for spreading a split-washer and removing the same from a shaft, including a holder on the handle bar for a shaft carrying a split washer, a pair of tensioned split-washer spreading and removing jaws carried by the handle lever in transverse alinement with said holder, the adjacent edges of said jaws having co-acting cam grooves and a pin carried by said holder and disposed between the cam grooves for cooperation with said cam grooves for spreading the jaws when the latter are moved toward the handle bar.

3. In a tool of the character described, a head, a handle bar rigid with the head, a handle lever pivoted on the head and co-extensive with the handle bar, cooperating means carried by the handle bar and handle lever for spreading a split-washer and removing the same from a shaft, including a holder on the handle bar for a shaft carrying a split washer, a pair of tensioned split-washer spreading and removing jaws carried by the handle lever in transverse alinement with said holder, and means carried by the holder for spreading said jaws when the latter are moved toward the handle bar, the free ends of the jaws presenting a V-formation with the apex of the V-formation adapted for placement between the split ends of a washer.

4. In a tool of the character described, a head, a handle bar rigid with the head, a handle lever pivoted on the head and co-extensive with the handle bar, cooperating means carried by the handle bar and handle lever for spreading a split-washer and removing the same from a shaft, including a holder on the handle bar for a shaft carrying a split washer, a pair of tensioned split-washer spreading and removing jaws carried by the handle lever in transverse alinement with said holder, the adjacent edges of said jaws having co-acting cam grooves and a pin carried by said holder and disposed between the cam grooves for cooperation with said cam grooves for spreading the jaws when the latter are moved toward the handle bar, the free ends of the jaws presenting a V-formation with the apex of the V-formation adapted for placement between the split ends of a washer.

JAMES E. HEHIR.